United States Patent [19]
Yun et al.

[11] Patent Number: 5,194,202
[45] Date of Patent: Mar. 16, 1993

[54] FORMATION OF CERAMIC-METAL COMPOSITE BY PRESSURE CASTING AND OXIDATION SINTERING

[75] Inventors: David I. Yun, Murrysville; Robert A. Marra, Penn Hills; Thomas B. Gurganus, New Kensington, all of Pa.; P. Victor Kelsey, Jr., Wilmington, Del.

[73] Assignee: Aluminum Company of America, Pittsburgh, Pa.

[21] Appl. No.: 757,932

[22] Filed: Sep. 12, 1991

Related U.S. Application Data

[63] Continuation-in-part of Ser. No. 563,046, Aug. 3, 1990, abandoned.

[51] Int. Cl.$^5$ .................... C04B 40/00; B22D 19/00
[52] U.S. Cl. .................... 264/60; 164/98; 164/100; 164/103; 264/65; 264/82
[58] Field of Search .................... 264/60, 65, 82, 109, 264/241, DIG. 36, 125, 265, 271.1; 164/53, 54, 91, 98, 100, 103; 427/343, 443.2

[56] References Cited

U.S. PATENT DOCUMENTS

| | | |
|---|---|---|
| 4,232,091 | 11/1980 | Grimshaw et al. .................... 164/91 |
| 4,450,207 | 5/1984 | Donomoto et al. .................... 428/614 |
| 4,713,360 | 12/1987 | Newkirk et al. .................... 501/87 |
| 4,874,569 | 10/1989 | Kuszyk et al. .................... 264/60 |
| 4,935,055 | 6/1990 | Aghajanian et al. .................... 164/66.1 |

Primary Examiner—Jan H. Silbaugh
Assistant Examiner—Christopher A. Fiorilla
Attorney, Agent, or Firm—Glenn E. Klepac

[57] ABSTRACT

A method of forming a ceramic-metal composite including steps of providing a body of ceramic material; infiltrating molten metal into open spaces of the body at an elevated pressure; cooling the metal to form a solid composite; and reacting a portion of the metal in the composite at an elevated temperature with an oxidizing gas. A particularly preferred composite is made by infiltrating an alumina body with an aluminum alloy and then oxidizing in air at an elevated temperature. The composite is useful for making armor plate and other products where a combination of high hardness, good strength, and light weight are needed.

20 Claims, 2 Drawing Sheets

FORMATION OF CERAMIC-METAL COMPOSITE BY PRESSURE CASTING AND OXIDATION SINTERING

Pending Related Application

This application is a continuation-in-part of U.S. Ser. No. 563,046 filed Aug. 3, 1990 (now abandoned).

Field of the Invention

The present invention relates to manufacture of ceramic-metal composite articles. More particularly, the invention comprises a method of forming a ceramic-metal composite having improved properties. The resultant composite is useful as armor plate and in other end uses where high hardness, good strength, and light weight are desirable.

Background of the Invention

Numerous methods for forming ceramic-metal composite materials are known in the prior art. However, these prior art techniques generally suffer from one or more serious disadvantages making them less than entirely suitable for their intended purpose.

For example, Newkirk et al U.S. Pat. No. 4,713,360 describes a method for fabricating ceramic matrix composites by wicking liquid metal through microscopic channels in a mass of filler material with subsequent reaction of the molten metal and a gaseous oxidant. In one example, a molten aluminum alloy is reacted with air to form alpha-alumina. The method described by Newkirk et al is limited by slow reaction rates.

Donomoto et al U.S. Pat. No. 4,450,207 describes a fiber reinforced metal-ceramic composite material comprising a mass of reinforcing fibers intimately bound with a metal matrix. The patent does not suggest subsequent reaction of the metal with an oxidizing gas.

Aghajanian et al U.S. Pat. No. 4,935,055 claims a process in which a metal matrix composite is formed by "spontaneously" infiltrating a molten Al-Mg alloy into a permeable mass of alumina filler material. In order to achieve sufficient wetting of the alumina, the process is preferably conducted in a reactor permeated with 100% nitrogen gas (Col. 10, lines 19-22). Any other gas which is present as an impurity in the nitrogen should be insufficient to oxidize the metal to any substantial extent (Col. 3, lines 43-46). If an oxidizing gas were present, it would interfere with wetting of the ceramic filler. Example I of the patent states that the metal nitriding reaction required 20 hours at 865° C. with 100% nitrogen gas. Several more hours were required for ramp-up to 865° C. and for ramp-down to ambient temperature. In contrast, the process claimed herein infiltrates molten aluminum alloys into porous ceramic materials nearly instantaneously at 10,000 psi. The metal matrix composites are then reacted with an oxygen-containing gas at an elevated temperature.

A principal object of the present invention is to provide a method of manufacturing a ceramic-metal composite material having sufficiently low cost for implementation on a commercial scale.

Another object of the present invention is to provide a method for manufacturing a ceramic-metal composite which does not require surface treatment of the ceramic before contact with metal.

Additional objects and advantages of the present invention will become apparent to persons skilled in the art from the following specification and claims.

SUMMARY OF THE INVENTION

The present invention is a method for forming a ceramic-metal composite comprising steps of (a) providing a body or matrix of ceramic reinforcing material; (b) infiltrating molten metal into open spaces of the body at an elevated pressure; (c) cooling the metal to form a solid ceramic-metal composite; and (d) reacting a portion of the metal in the composite at an elevated temperature with oxygen. The ceramic body is preferably heated before molten metal is infiltrated into the open spaces.

The body or matrix preferably comprises a ceramic selected from the group consisting of aluminum oxide; aluminum borate; boron, silicon, or titanium carbide; aluminum, titanium, silicon or zirconium nitride; titanium diboride; and SiAlON. The body may be formed by sintering a plurality of ceramic particles at an elevated temperature.

The ceramic body comprises a substrate defining a network of open spaces. The substrate comprises about 50–95 vol% of the body and the open spaces about 5–50 vol%. More preferably, the substrate comprises about 60–90 vol% of the body. Optimally, the substrate comprises about 80–90 vol% and the open spaces about 10–20 vol%.

The molten metal preferably comprises aluminum or titanium or an alloy of aluminum or titanium. In a particularly preferred embodiment, an alumina body is combined with molten aluminum or an aluminum alloy.

The ceramic body is preferably preheated to avoid thermal shock when contacted with molten metal. For example, an alumina body may be preheated to about 300°–1100° C. at a rate of about 0.2° to 100° C. per hour. The alumina body is then contacted with molten aluminum superheated about 20°–200° C. above its melting point.

Molten metal is infiltrated into open spaces of the ceramic body at a pressure greater than about 1000 psi. Metal is preferably forced into the spaces at about 1000–20,000 psi. The pressure is about 10,000 psi in a particularly preferred embodiment.

After the molten metal is solidified, a portion of the metal is reacted with an oxidizing gas at an elevated temperature which is preferably greater than about 1000° C. The oxidizing gas generally comprises at least about 1 vol% $O_2$ and is preferably air. Aluminum may be reacted with oxygen (from air) at about 1000°–1500° C. to form aluminum oxide. Usually about 5–20 wt% of the infiltrated aluminum is oxidized to aluminum oxide.

DETAILED DESCRIPTION OF A PREFERRED EMBODIMENT

Figure 1:
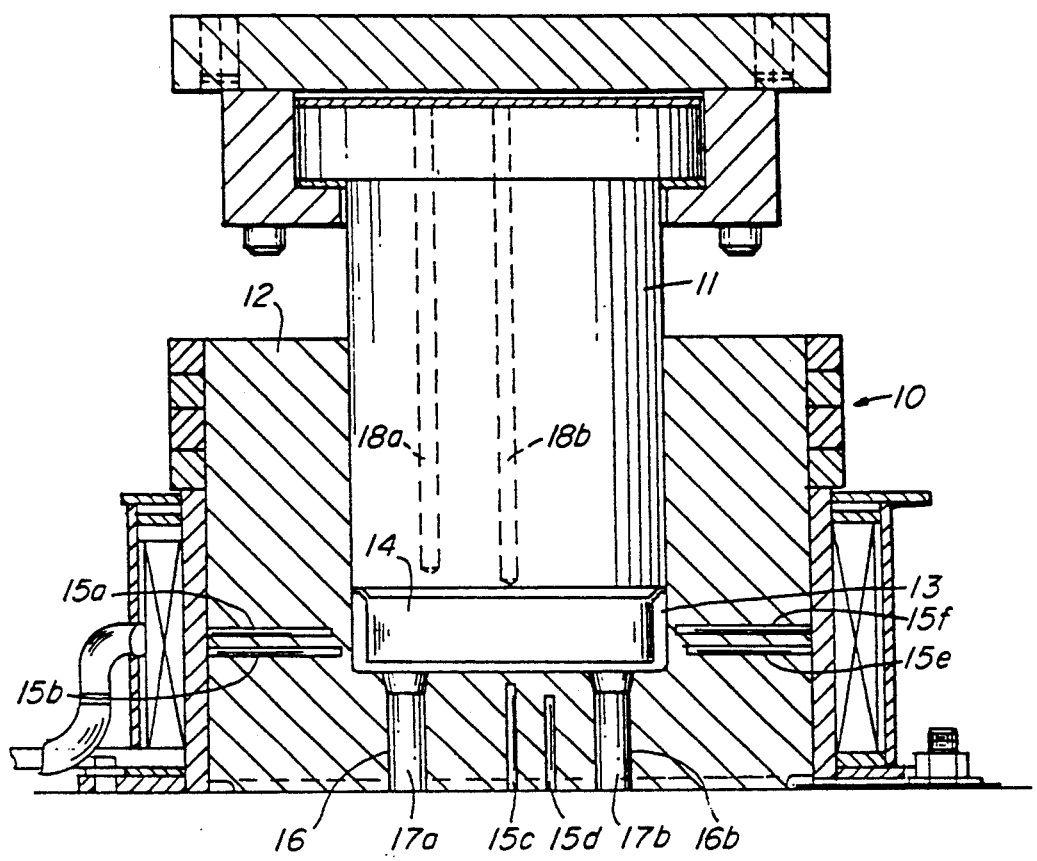
FIG. 1 is a fragmentary cross-sectional view of a pressure casting apparatus for performing the method of the present invention.

Referring now to FIG. 1, there is shown a pressure casting apparatus 10 for performing the method of the present invention. The apparatus 10 comprises a generally cylindrical piston 11 fitted snugly within a metal block 12. The block 12 contains a graphite mold or die 13 defining a die cavity 14. The block 12 also defines smaller openings 15a, 15b, 15c, 15d, 15e, 15f for thermocouples and bottom holes 16a, 16b, containing ejector pins 17a, 17b. The piston 11 contains slots 18a, 18b, for thermocouples or other temperature measuring devices. Constant temperature measurement around the die 13 assures good process control.

Figure 2:
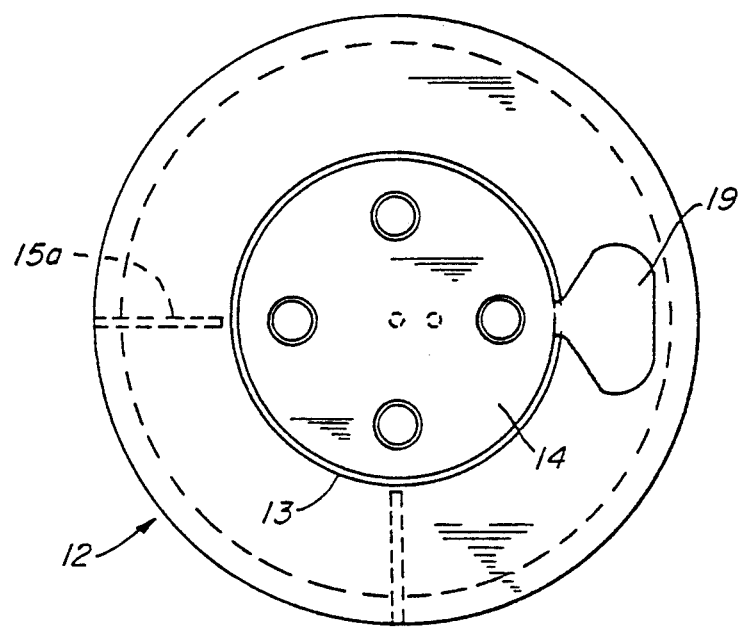
FIG. 2 is a top plan view of a metal block and casting die for manufacturing a ceramic-metal composite in accordance with the invention.
Figure 3:
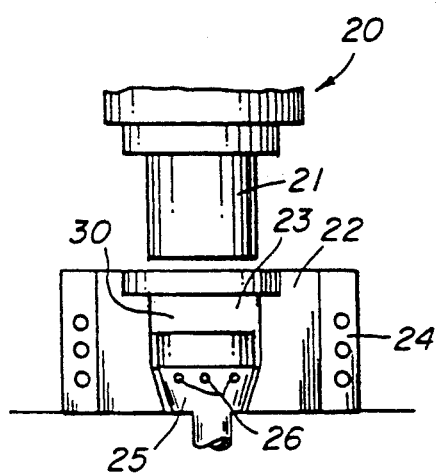
FIGS. 3–6 schematically illustrate sequential steps in the method of the present invention.

In FIG. 2, there is shown a top plan view of the metal block 12. The metal block 12 circumscribes a generally cylindrical opening for the graphite mold or die 13. Molten metal is poured into the die cavity 14 through a pour hole 19.

An alternative embodiment of an apparatus 20 for performing the method of the invention is illustrated schematically in FIGS. 3-6. This alternative apparatus 20 comprises a generally cylindrical piston 21 fitted within a metal die or block 22. The apparatus 20 does not include any graphite insert. The die 22 defines a generally cylindrical die cavity or mold cavity 23. The die 22 is heated by exteriorly located electric heating coils 24. Below the die cavity 23, there is an ejector 25 for removing the product. The ejector 25 is formed with openings containing thermocouples 26.

In accordance with the invention, ceramic material comprising whiskers, filaments, or powder is combined with a small quantity (less than one wt%) of an organic binder such as polyvinyl acetate or polyvinyl alcohol. The ceramic material is then compacted to form a preform or body by a technique such as uniaxial compaction, isostatic pressing, or slip casting. The preform comprises a substrate or matrix of solid ceramic material defining a network of open spaces or interstices. The substrate typically makes up about 50 vol% of the preform and the open spaces about 50 vol%.

The preform is generally partially sintered to increase its density, reduce porosity, and remove the organic binder. For example, a preform of alpha-alumina particles may be sintered at 1200° C. for four hours, at 1300° C. for three hours, or at 1400° C. for one hour. Sintering has been measured in one instance to increase percentage solids content from about 50% to about 85%. In other words, porosity was reduced from about 50 vol% to about 15 vol%.

The compacted and sintered ceramic body 30 is preferably preheated in a separate furnace (not shown) and then placed inside the die cavity 23 to avoid thermal shock upon contact with molten metal. For example, an alumina body may be preheated to about 300°-1100° C. In one preferred example, an alumina preform was preheated to about 900° C. The die 22 is also preheated to about 150°-450° C., preferably about 350° C. Preheating the die 22 minimizes cooling of the ceramic body 30.

Figure 4:
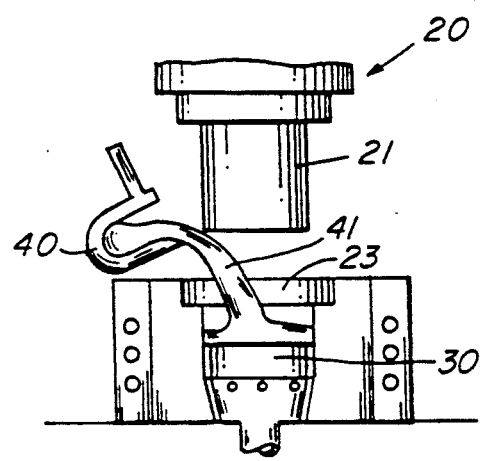

Referring now to FIG. 4, a crucible 40 containing molten metal 41 is next positioned adjacent the apparatus 20. The metal 41 is poured into the cavity 23, contacting the ceramic body 30. When the ceramic body 30 is alumina, the molten metal 41 will generally be an aluminum alloy. Some useful metals are aluminum alloys of the 1000, 2000, 5000, 6000, or 7000 Aluminum Association series. Representative examples of such alloys include 2024, 2124, 5052, 5154, 6009, 6010, 6011, 6013, 6061, 6063, 7050, and 7075. Aluminum alloys of the 6000 series are particularly preferred.

Figure 5:
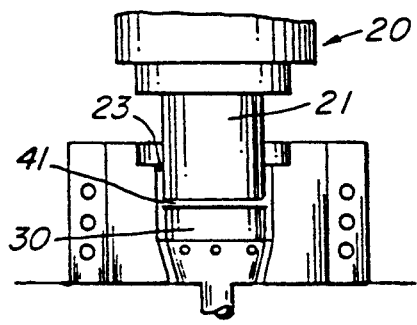

The cylindrical piston 21 is next lowered into the die cavity 23. As shown in FIG. 5, the piston 21 compresses molten metal 41 adjacent the body 30, so that metal infiltrates into open spaces of the body 30. In the preferred embodiment shown in FIG. 5, the piston 21 applies a pressure of approximately 10,000 psi. Pressure is applied for approximately 1-5 minutes, preferably about 2-3 minutes, to assure even infiltration throughout the body 30. The apparatus is cooled to solidify the infiltrated metal under pressure.

Figure 6:
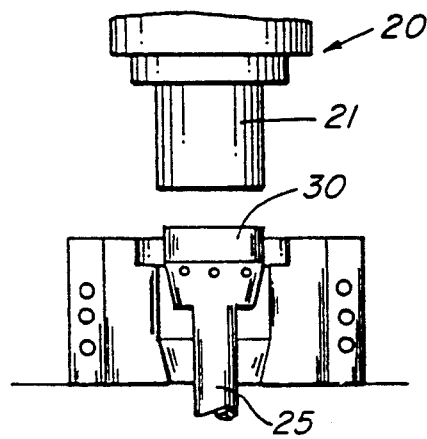

Referring now to FIG. 6, the piston 21 is lifted upwardly and the composite ceramic-metal body 30 is further cooled for removal. The ejector 25 is then pushed upwardly to facilitate removal of the composite 30.

Infiltrating molten metal into a ceramic body in accordance with the present invention provides significant improvement in flexure strength. In one experiment, a body made by sintering alpha-alumina particles had an initial flexure strength of 383 MPa. Infiltration with 99.99 wt% Al at 10,000 psi improved flexure strength of that body to 610 MPa. In contrast, a body of alpha-alumina particles and aluminum made by the method of U.S. Pat. No. 4,713,360 had flexure strength of only 500 MPa.

A set of experiments was performed to test various conditions for making alumina-aluminum composites in accordance with the invention. Results are summarized in Table 1. All samples were made by infiltrating aluminum into an alpha-alumina matrix at 10,000 psi and 900° C. Samples 1-5 utilized 99.99 wt% Al and Sample 6 used an Al-7Mg-2Si alloy. After partial sintering at the stated temperatures and times, only alpha-alumina and aluminum phases were observed by x-ray.

TABLE 1

Properties of Pressure Cast Alumina Preforms

| Sample No. | Preform Composition | Partial Sintering Conditions | Hardness (kg/mm$^2$) | MOR (MPa) | Fracture Toughness (MPa.m$^{\frac{1}{2}}$) |
|---|---|---|---|---|---|
| 1. | Al$_2$O$_3$ | Green | 362 | 606 | high |
| 2. | Al$_2$O$_3$ | 1000° C./1 hr | 414 | 483 | high |
| 3. | Al$_2$O$_3$ | 1100° C./1 hr | 350 | 610 | high |
| 4. | Al$_2$O$_3$ | 1100° C./4 hr | 412 | — | high |
| 5. | Al$_2$O$_3$ | 1200° C./4 hr | 1356 | 529 | 5.4 |
| 6. | Al$_2$O$_3$ | 1300° C./2 hr | 1366 | — | — |

Two other sets of experiments also tested properties of ceramic-Al alloy composites before and after reaction sintering. The set of experiments summarized in Table 2 was performed by pressure casting an Al-7Mg-2Si alloy at 10,000 psi and 900° C. into various ceramic bodies. The experiments reported in Table 3 were performed on composites having the same composition as Table 2, except that a step for reaction sintering in air was added.

TABLE 2

Properties of Pressure Cast Composites Prior to Reaction Sintering

| Ceramic Composition | X-Ray Phases | Hardness (Kg/mm$^2$) |
|---|---|---|
| Al$_{18}$B$_4$O$_{33}$ | Al$_{18}$B$_4$O$_{33}$,Al,AlB$_{12}$,α-Al$_2$O$_3$ | 162 |
| TiB$_2$—Al$_{18}$B$_4$O$_{33}$ | Al$_{18}$B$_4$O$_{33}$,TiB$_2$,AlB$_{12}$,α-Al$_2$O$_3$ | 397 |

TABLE 3

Properties of Pressure Cast Composites After Reaction Sintering

| Ceramic Composition | Reaction Temp (°C.) | Sintering Time | Hardness (Kg/mm$^2$) | X-ray phases |
|---|---|---|---|---|
| Al$_2$O$_3$ | 900 | 24 h | 480 | α-Al$_2$O$_3$, Al,MgAl$_2$O$_4$,Si |
| Al$_2$O$_3$ | 900 | 48 h | 470 | α-Al$_2$O$_3$, Al,MgAl$_2$O$_4$,Si |
| Al$_{18}$B$_4$O$_{33}$ | 900 | 24 h | 242 | Al$_{18}$B$_4$O$_{33}$, AlBO$_3$,AlB$_{12}$,Al |
| Al$_{18}$B$_4$O$_{33}$ | 900 | 48 h | 97 | Al$_{18}$B$_4$O$_{33}$, AlBO$_3$,AlB$_{12}$,Al |

Specimens of the Al$_2$O$_3$ preforms infiltrated with Al-7Mg-2Si alloy and then oxidation sintered at 900° C. were examined by X-ray diffraction. It was estimated that approximately 10 wt% of the aluminum orignally present was conerted to magnesium aluminate spinel (MgAl$_2$O$_4$).

Oxidation sintering of cermaic preforms infiltated with aluminum or titanium will generally convert at least about 5 wt% of the metal to the corresponding oxide, as estimated by x-ray diffraction The extent of oxidation is usually about 5-20 wt%, and may be as high as about 50 wt%.

Under the sintering conditions described herein, nitrogen may be present in the oxidizing gas. For example, air normally contains approximately 78 vol% nitrogen. However, no substantial portion (i.e., less than 1 wt%) of the metal is converted to the corresponding nitride because reaction kinetics favor oxide formation. No aluminum nitride was found by x-ray diffraction in the aluminum-ceramic composites summarized in Table 3.

While the invention has been described in terms of preferred embodiments, the claims appended hereto are intended to encompass all embodiments which fall within the spirit of the invention.

What is claimed is:

1. A method of forming a ceramic-metal composite comprising the steps of:
   (a) providing a body of ceramic reinforcing material, said body comprising a substrate defining a network of open spaces;
   (b) infiltrating a molten metal into said open spaces of the body at an elevated pressure greater than about 1000 psi;
   (c) cooling said metal, thereby to form a solid ceramic-metal composite; and then
   (d) reacting about 5-50 wt.% of said metal in the composite at an elevated temperature with an oxidizing gas comprising O$_2$ to convert said metal to a ceramic material containing oxygen.

2. The method of claim 1 wherein said body comprises Al$_2$O$_3$, said method further comprising:
   (e) heating said body to about 300°-900° C. before step (b).

3. The method of claim 1 wherein said body comprises a ceramic selected from the group consisting of aluminum oxide; aluminum borate; boron, silicon or titanium carbide; aluminum, titanium, silicon, or zirconium nitride; titanium diboride; and SiAlON.

4. The method of claim 1 wherein said molten metal comprises an alloy of Al or an alloy of Ti.

5. The method of claim 1 wherein step (a) comprises:
   (1) providing a plurality of ceramic particles; and
   (2) sintering said particles at an elevated temperature to form a body comprising interconnected ceramic particles.

6. The method of claim 1 wherein the oxidizing gas comprises at least about 1 vol% O$_2$.

7. The method of claim 1 wherein about 5-20 wt% of the metal is oxidized in step (d).

8. The method of claim 1 wherein said substrate comprises about 50-95 of said body vol% and said open spaces comprise about 5-50 vol% of said body.

9. The method of claim 1 wherein the pressure in step (b) is less than about 20,000 psi.

10. The method of claim 1 wherein the pressure in step (b) is about 10,000 psi.

11. The method of claim 1 wherein said metal comprises Al and step (d) comprises reacting said Al with O$_2$ at about 1000°-1500° C.

12. The method of claim 1 wherein step (b) further comprises holding said body in a graphite die defining a die cavity.

13. The method of claim 1 wherein the elevated pressure of step (b() is applied for approximately 1-5 minutes.

14. A method of forming an alumina-aluminum alloy composite comprising the steps of:
   (a) providing an alumina body comprising a substrate defining a network of open spaces, said substrate comprising about 50-95 vol% of the body and said open spaces comprising about 5-50 vol%;
   (b) infiltrating as molten aluminum alloy into said open spaces of the body at a pressure greater than about 1000 psi;
   (c) cooling said aluminum alloy, thereby to form a solid composite comprising alumina and an aluminum alloy; and then
   (d) reacting 5-50 weight % of the aluminum alloy in the composite at an elevated temperature greater than about 1000° C. with an a oxidizing gas comprising O$_2$ to oxidize the aluminum alloy.

15. The method of claim 14 wherein said oxidizing gas is air.

16. The method of claim 14 wherein said aluminum alloy is an alloy of the 1000, 2000, 5000, 6000, or 7000 series.

17. The method of claim 14 wherein said substrate comprises about 60-90 vol% of the body and said open spaces about 10-40 vol%.

18. The method of claim 14 wherein the pressure is step (b) is about 1000-20,000 psi.

19. The method of claim 14 wherein the oxidizing gas comprises at least about 1 vol% O$_2$.

20. The method of claim 14 wherein about 5-20 wt% of the aluminum is oxidized to Al$_2$O$_3$ in step (d).

* * * * *